(12) United States Patent
Fettinger et al.

(10) Patent No.: US 12,294,201 B2
(45) Date of Patent: May 6, 2025

(54) PORTABLE POWER SUPPLY DEVICE FOR BUILDING EQUIPMENT

(71) Applicants: Carrier Corporation, Palm Beach Gardens, FL (US); Otis Elevator Company, Farmington, CT (US)

(72) Inventors: James Fettinger, Huntington, IN (US); Joseph R. Turner, Fort Wayne, IN (US); Andrew M. Ramser, Fort Wayne, IN (US); Paul Cornett, Jr., Florence, SC (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 71 days.

(21) Appl. No.: 17/654,676

(22) Filed: Mar. 14, 2022

(65) Prior Publication Data

US 2022/0302544 A1    Sep. 22, 2022

Related U.S. Application Data

(60) Provisional application No. 63/200,573, filed on Mar. 16, 2021.

(51) Int. Cl.
*H02B 1/52*    (2006.01)
(52) U.S. Cl.
CPC ..................... *H02B 1/52* (2013.01)
(58) Field of Classification Search
CPC . H02B 1/36; H02B 1/52; H02B 1/308; H02B 7/06; H02B 1/24; H02B 1/30; H02B 1/565; H01F 27/02; H01F 29/02; Y04S 20/222; Y02T 10/70; H04L 1/0041

See application file for complete search history.

(56) References Cited

U.S. PATENT DOCUMENTS

| | | | | |
|---|---|---|---|---|
| 5,164,609 | A * | 11/1992 | Poppe | G08B 13/1409 307/147 |
| 5,804,953 | A * | 9/1998 | Bowyer | H02M 5/458 323/341 |
| 2006/0198171 | A1* | 9/2006 | Samodell | H02M 1/10 363/41 |
| 2012/0278016 | A1* | 11/2012 | Huff | G01R 21/133 702/62 |
| 2020/0119551 | A1* | 4/2020 | Saylor | H02B 1/52 |
| 2020/0259336 | A1* | 8/2020 | Rao | H02B 1/056 |

\* cited by examiner

*Primary Examiner* — Adam B Dravininkas
(74) *Attorney, Agent, or Firm* — Souad Hakim

(57) ABSTRACT

Disclosed is a method of supplying power to a building equipment technician in the field. The method comprises providing a movable power conversion device having a transformer, an input voltage selector, a building power interface cable, and a power receptacle. The method further comprises moving the movable power conversion device to a location proximate a building power grid and an area comprising building equipment; setting the input voltage selector to an unpowered position; connecting the building power interface cable to the building power grid; and selecting a supply voltage of the building power grid with the input voltage selector.

9 Claims, 5 Drawing Sheets

PORTABLE POWER SUPPLY DEVICE FOR BUILDING EQUIPMENT

This application claims the benefit of U.S. Provisional Application No. 63/200,573 filed Mar. 16, 2021, the contents of which are hereby incorporated in their entirety.

BACKGROUND

Exemplary embodiments pertain to the art of field service and repair tools and methods. More particularly, the present disclosure relates to configurations of field power supply systems.

During construction and maintenance activities of building equipment technicians need access to a reliable power source for powering construction and service tools, lighting, and equipment. When borrowing building power through a building receptacle, e.g., disposed in a common area of the building, accidental disconnection of technician's power can occur. Such events can force the technician to stop their work and restore power to their tools before continuing their work. However, particularly during building construction, the building power receptacles can be unreliable. Accordingly, there remains a need for power supply systems that can interconnect to building power and reduce service or construction personnel down-time when working on building equipment.

BRIEF DESCRIPTION

A method of supplying power to a building equipment technician in the field comprising: providing a movable power conversion device having a transformer, an input voltage selector, a building power interface cable, and a power receptacle; moving the movable power conversion device to a location proximate a building power grid and an area comprising building equipment; setting the input voltage selector to an unpowered position; connecting the building power interface cable to the building power grid; selecting a supply voltage of the building power grid with the input voltage selector.

In addition to one or more of the above disclosed aspects or as an alternate, further comprising powering a power tool, a light, a sensor, or a combination comprising at least one of the foregoing from the power receptacle.

In addition to one or more of the above disclosed aspects or as an alternate, further comprising activating an indicator when the power interface cable is correctly connected to the building power grid.

In addition to one or more of the above disclosed aspects or as an alternate, further comprising activating an indicator when the power interface cable is incorrectly connected to the building power grid.

In addition to one or more of the above disclosed aspects or as an alternate, wherein the movable power conversion device further comprises an output voltage indicator, and wherein the method further comprises displaying an output voltage value on the output voltage indicator.

Also disclosed is a movable power conversion device comprising: a housing; a building power interface cable configured to pass through the housing and attach to a building power grid; a plurality of input fuses operatively coupling the building power interface cable to an input voltage selector, wherein the input voltage selector is configured to allow a user to select a voltage of the building power grid; a transformer having an input side and an output side, wherein the input side is operatively coupled to the input voltage selector and the output side is operatively coupled to a power receptacle.

In addition to one or more of the above disclosed aspects or as an alternate, wherein the transformer comprises three or more voltage input connections and the input voltage selector is operable to switch electrical connectivity between said input connections and the building power interface cable such that the transformer input voltage is selectable between two or more voltage input levels by the input voltage selector.

In addition to one or more of the above disclosed aspects or as an alternate, wherein the input voltage selector comprises a multi-position switch operable to electrically connect and disconnect the building power interface cable and the transformer input side, and operable to switch electrical connectivity between input terminals of the transformer to which the building power interface cable is connected.

In addition to one or more of the above disclosed aspects or as an alternate, further comprising a plurality of wheels affixed to the housing.

In addition to one or more of the above disclosed aspects or as an alternate, further comprising an extendable handle affixed to the housing.

In addition to one or more of the above disclosed aspects or as an alternate, further comprising a cable retainer affixed to the housing for retaining the building power interface cable.

In addition to one or more of the above disclosed aspects or as an alternate, further comprising a cable retainer affixed to the extendable handle for retaining the building power interface cable.

In addition to one or more of the above disclosed aspects or as an alternate, wherein the input voltage selector is configured to pass through the housing.

In addition to one or more of the above disclosed aspects or as an alternate, wherein the input voltage selector comprises a three-position switch.

In addition to one or more of the above disclosed aspects or as an alternate, wherein the power receptacle comprises a ground fault current interrupter circuit.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
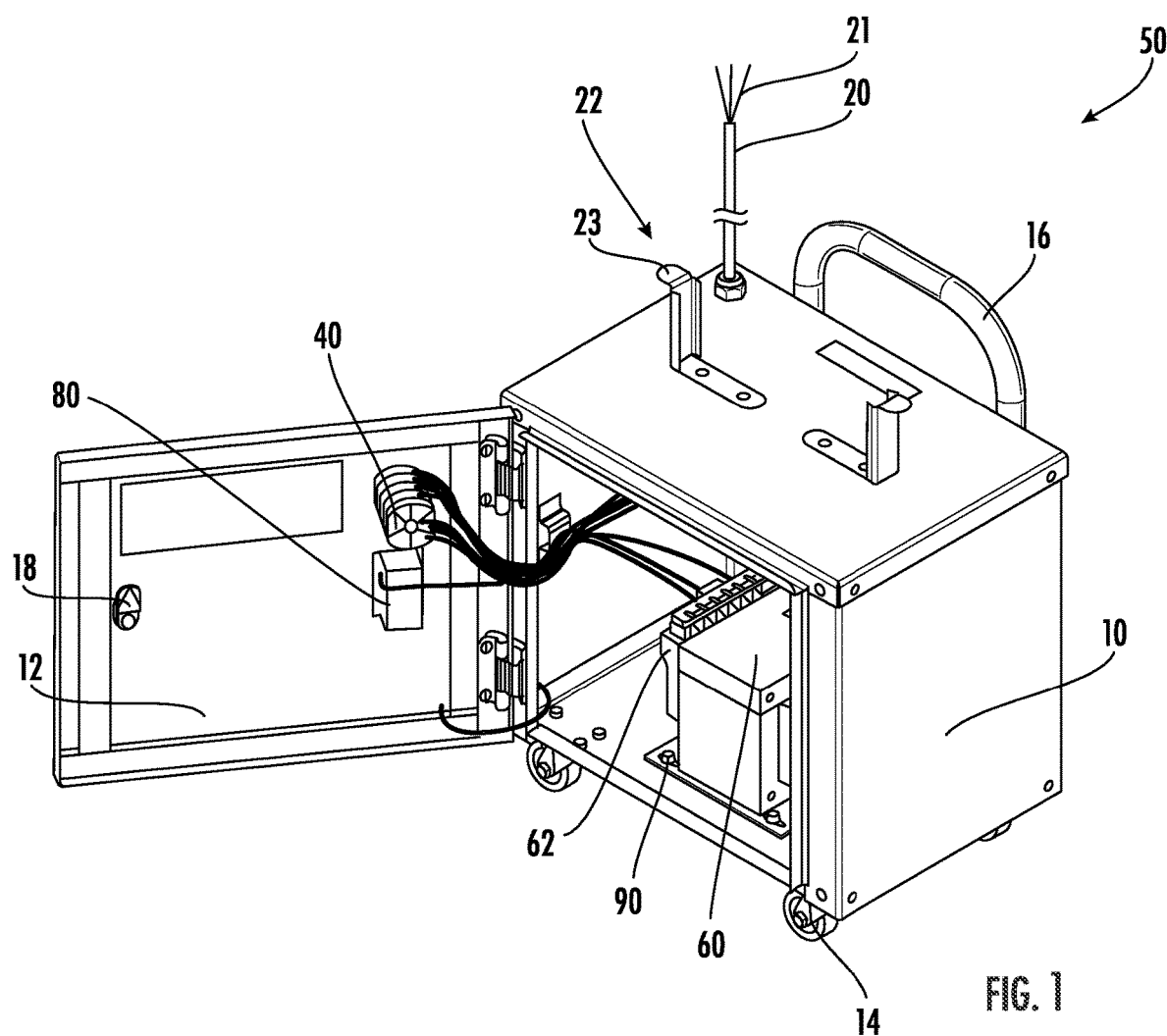
FIG. 1 is a schematic illustration of a front perspective view of a movable power conversion device with the door open.
Figure 2:
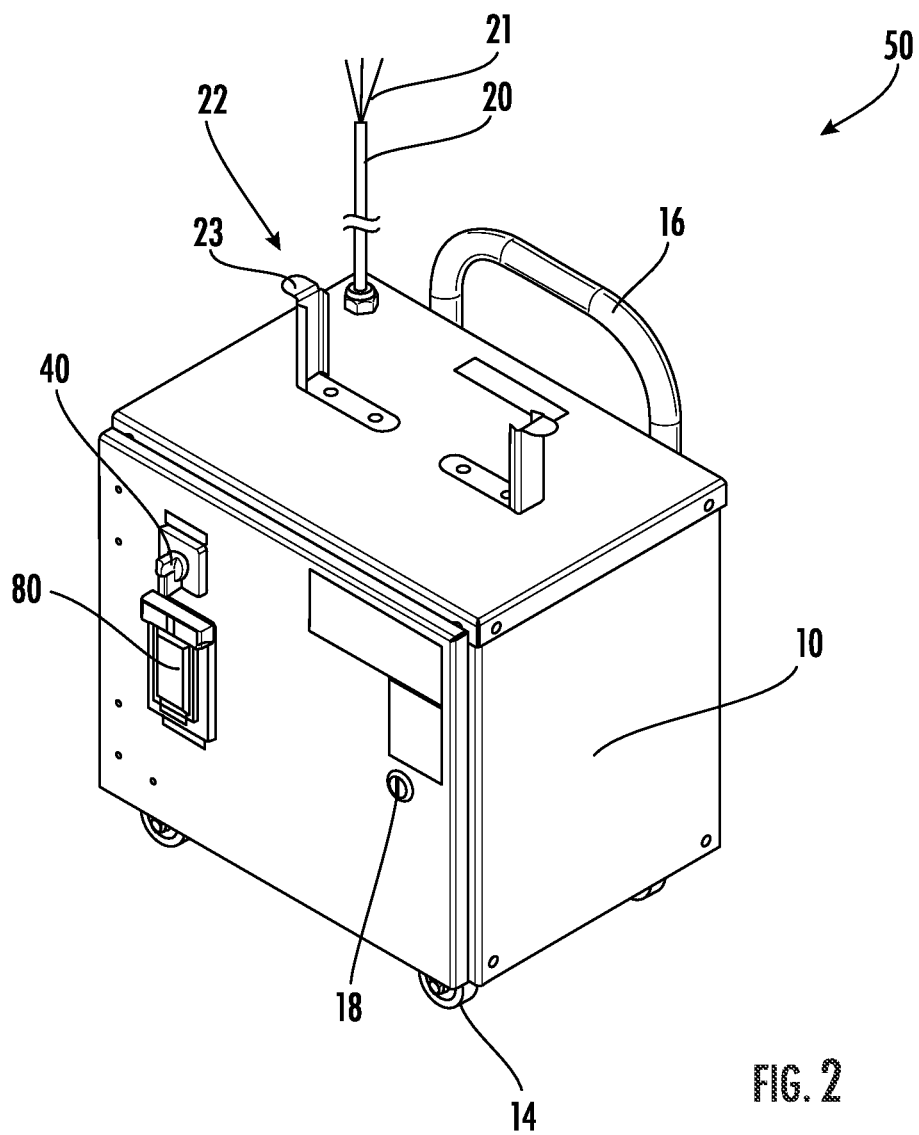
FIG. 2 is a schematic illustration of a front perspective view of a movable power conversion device with the door closed.

FIGS. 1-2 are schematic illustrations of perspective views of a movable power conversion device 50. The device can include a housing 10, having a door 12 opening to access an interior of the housing 10. The housing 10 can be made of plastic or metal (e.g., aluminum, steel, alloys thereof, polypropylene, acrylonitrile butadiene styrene (ABS), polytetrafluoroethylene (PTFE), or other plastic). The door 12 can optionally include a door handle for opening and closing the door 12. The door can include a lock mechanism 18 (e.g., a cam lock, or the like) for locking the door 12 to the housing 10 to prevent unwanted opening of the door 12 (e.g., during use or storage). The movable power conversion device 50 can further include a plurality of wheels 14 (e.g., castors, or the like) affixed to the housing 10. A handle 16 can be affixed to the housing 10 (e.g., a permanently extended handle, or an extendable handle, such as a telescoping handle, or the like).

The movable power conversion device 50 can include a building power interface cable 20, a plurality of input fuses 30, and input voltage selector 40, a transformer 60, and a receptable 80 disposed within an electrical circuit. The building power interface cable 20 can include flying leads 21 along one end for connecting the movable power conversion device 50 to the building power grid 115. The building power interface cable 20 can be operably connected at the other end to the plurality of input fuses 30 (e.g., to prevent over-current conditions on the internal wiring and components of the movable power conversion device 50). The housing 10 and or the handle 16 can include a building power interface cable retainer system 22 for securing the building power interface cable 20 to the movable power conversion device 50. For example, the retainer system 22 can include one or more projections 23 from the housing 10 or handle 16 where the building power interface cable 20 can be wrapped and stored while the power conversion device 50 is not in use or when there is excess slack on the cable after installation. In an embodiment, the handle 16 can also serve as a projection 23 from the housing 10 onto which the building power interface cable 20 can be secured.

The plurality of input fuses 30 can be operatively coupled along one side to the building power interface cable 20 and along another side to the input voltage selector 40. The fuses can act to prevent excessive current flow through the components of the movable power conversion device 50. Each fuse of the plurality of inlet fuses can be sized according the expected operating conditions, e.g., sized as a function of the input voltage and corresponding current flowing through the conductor of the building power interface cable 20. The plurality of inlet fuses 30 can be configured into two or more parallel circuits for each non-ground conductor of the building power interface cable 20 (e.g., connected to two or more poles of the input voltage selector 40). For example, the building power interface cable 20 can include three conductors (e.g., positive, negative, and ground) and the two non-ground conductors can each be operably coupled in parallel to two fuses, one of higher current capacity than the other. These fuses can in turn be operably connected to input poles of the input voltage selector 40 to prevent excessing current flow from entering the input voltage selector 40.

The input voltage selector 40 can include a multi-pole switch to allow a user to select between two or more circuit configuration. For example, a first circuit configuration can establish electrical connectivity between the input voltage selector 40 and a first pair of fuses, a second circuit configuration can establish electrical connectivity between the input voltage selector 40 and a second pair of fuses, and a third circuit configuration can disconnect the input voltage selector 40 from the plurality of input fuses 30. In this example, the first pair of fuses can have a higher electrical current threshold than the second pair of fuses, and the first circuit configuration can connect the movable power conversion device 50 to a higher voltage interface of the building power grid 115. In an example, the first pair of fuses can have an electrical current threshold rating of about two times the second pair of fuses. For example, the first pair of fuses can include 20 Amp (A) fuses and the second pair of fuses can include 10 A fuses. The individual fuses of the plurality of input fuses 30 can each have electrical current thresholds of up to 40 A.

The transformer 60 can mounted within the interior of the housing 10 and can be electrically coupled to the building power interface cable 20 through the plurality the input voltage selector 40. The transformer 60 can be sized for the desired power and voltage level of the building that the movable power conversion device 50 will be connected to. For example, the movable power conversion device 50 can be configured to connect to AC building circuits of up to 600 Volts (VAC), for example, configured for input levels of about 575 VAC, or about 480 VAC, or about 460 VAC, or about 230 VAC, or about 220 VAC, or about 208 VAC. As mentioned previously, the plurality of input fuses 30 can be sized consistent with the expected conditions of the AC building circuits to prevent over-current within the movable power conversion device 50.

The transformer 60 can include multiple input voltage taps along its input side 62. The multiple taps can allow for more than one input voltage to be applied to the input of the transformer 60. For example, two conductors of the building power interface cable 20 can each be configured into parallel circuits of different electrical capacity, each circuit electrically coupled to the input voltage selector 40 via differently sized input fuses. The higher current, higher voltage leg of each of the two parallel circuits can be joined across the entire input coil of the transformer 60 to provide a first input voltage to the transformer 60 while the lower current, lower voltage leg of each of the parallel circuits can be operatively connected to a middle tap and an end tap of the input coil of the transformer 60 to provide a second input voltage to the transformer 60. In this case, the first input voltage of the transformer 60 can be greater than the second input voltage of the transformer 60.

Figure 3:
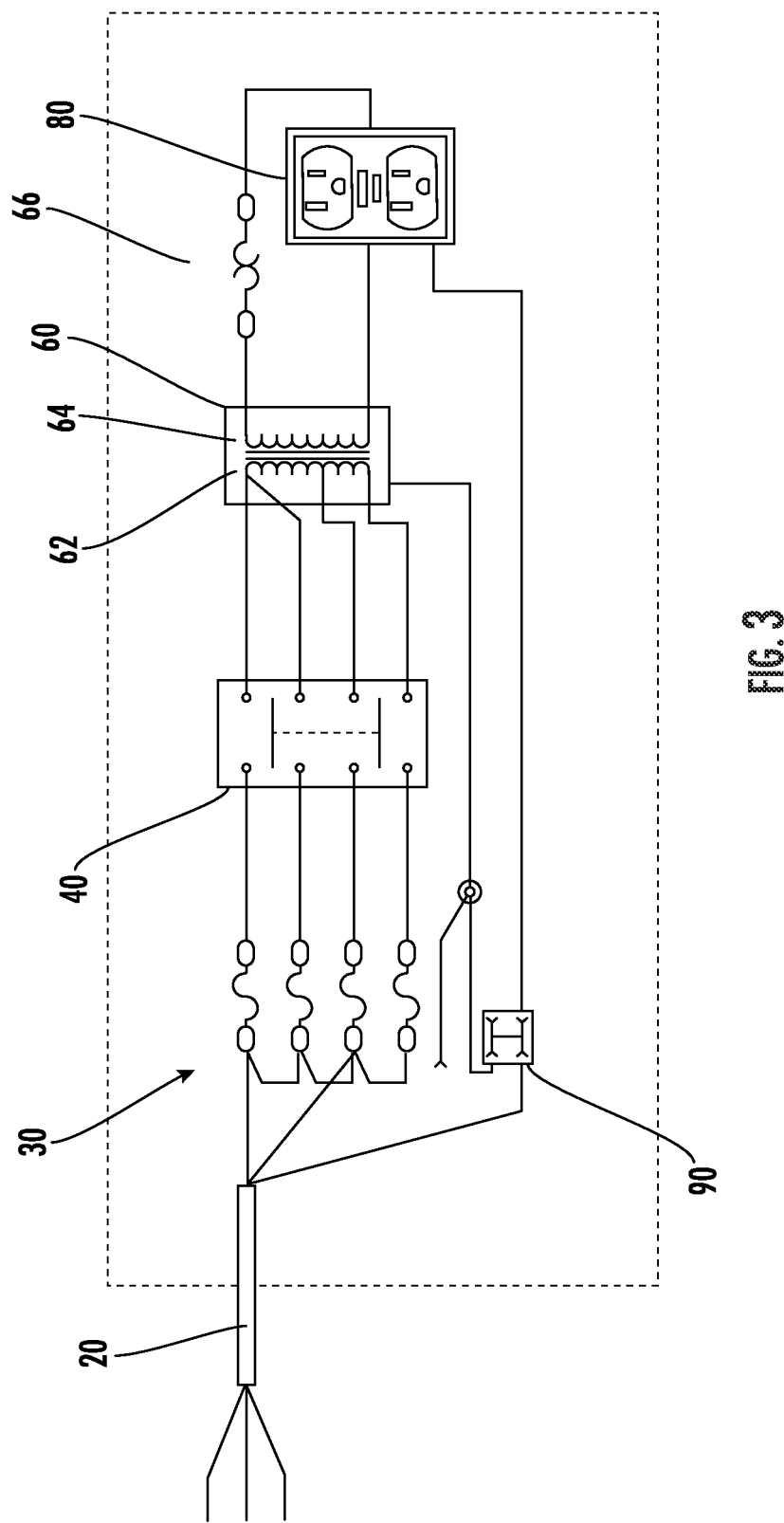
FIG. 3 is a schematic illustration of a wiring diagram for an electric circuit of a movable power conversion device.

FIG. 3 is an illustration of an electrical circuit diagram of the movable power conversion device 50. The building power interface cable 20 can include three conductors. Two of the conductors can be operably connected to the input fuses of the plurality of input fuses 30. For example, each of the two conductors can be configured into parallel circuits operably connected to separate, differently sized, input fuses. Each of the input fuses can be operably connected to the input side of the input voltage selector 40. The output of the input voltage selector 40 can be operably connected to the input side 62 of the transformer 60. For example, two outputs from the input voltage selector 40 can be operably connected to either end of the transformer's input coil to provide the largest input voltage to the transformer 60 and another two outputs from the input voltage selector 40 can be operably connected to one end and to a center tap of the of the transformer's input coil to provide a lesser voltage input to the transformer 60. The third conductor of the building interface power cable 20 can be a ground and can be operably connected to a common ground terminal 90 of the movable power conversion device 50.

The output side 64 of the transformer 60 can be operably connected to a power receptacle 80 (e.g., a duplex, including a ground fault current interrupter (GFCI) circuit, or the like).

The power receptacle 80 can be sized for up to 220 VAC output, for example, sized for output voltages of 220 VAC, or 210 VAC, or 120 VAC, or 110 VAC, or 100 VAC. The power receptacle 60 can be operably connected to the outlet side 64 of the transformer 60 via a circuit breaker 66 which can act as a safeguard against over-current conditions at the power receptacle 80. The power receptacle 80 can include any suitable electrical interface (e.g., accepting North American, South American, European, or Asian plug styles), such as an electrical outlet capable of supplying power to one or more power tools (e.g., drill, driver, saw, wrench, and the like), lights, or sensors.

Figure 4:
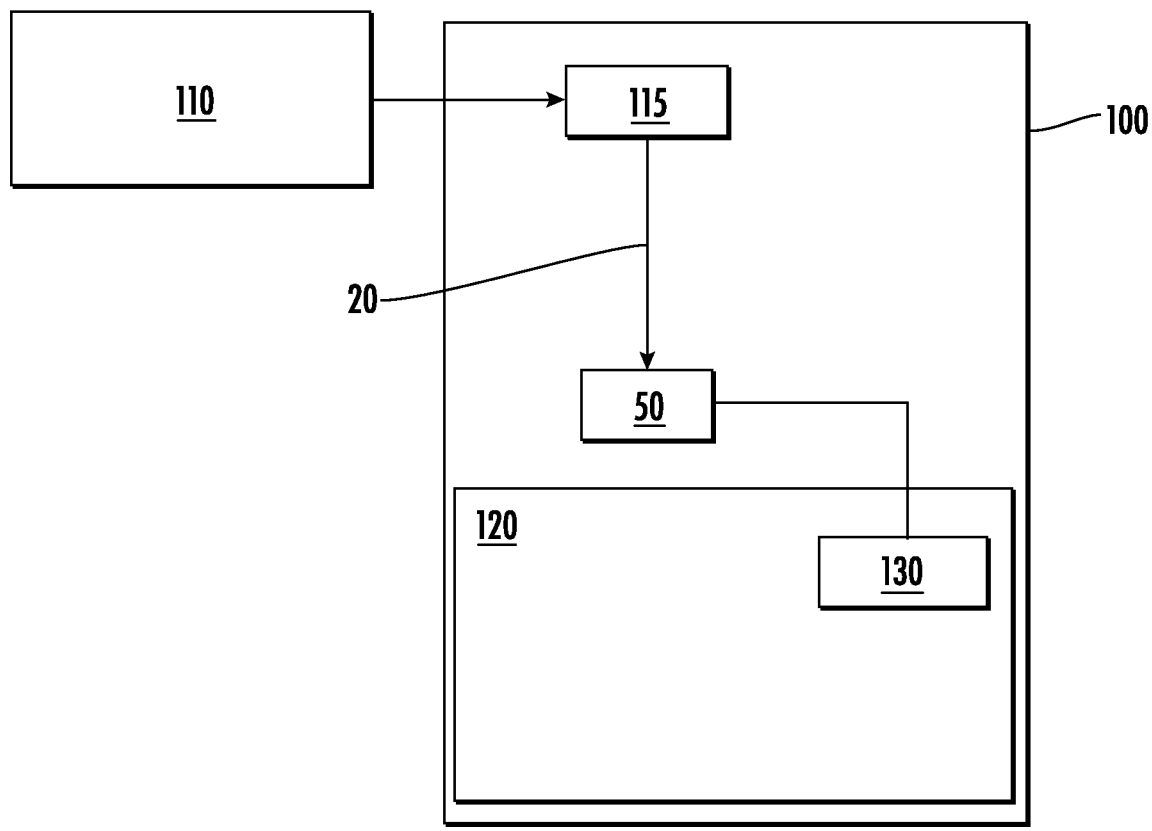
FIG. 4. is a schematic illustration of a method of supplying power to a building equipment technician in the field using a movable power conversion device.

FIG. 4 is a schematic illustration of the movable power conversion device 50 deployed to an interior or exterior area 100 of a building to support installation, repair, or maintenance work of building equipment. The wheels 14 and handle 16 allow a building equipment service personnel (e.g., a building equipment construction worker or repairperson, equipment technician, or the like), to move the movable power conversion device 50 to a location proximate to work area 120 where repair or construction work can be done. Once the movable power conversion device 50 is moved proximate to the work area 120 (e.g., including within the work area 120), the worker can connect the building power interface cable 20 to the building power grid 115 (e.g., dedicated HVAC or elevator system power takeoff from the building main power) which in turn can be operably connected to a power grid 110 (e.g., a utility or local power source).

The worker then has access to a dedicated power source to power one or more pieces of work equipment 130 needed to perform their job. For example, the work equipment 130 can include one or more power tools (e.g., drill, driver, saw, wrench, and the like), lights, sensors (e.g. cameras, hazard detectors, gas detectors ($CO$, refrigerants identified as A2L or A3 by ASHRAE Standard 34 (2019) such as R-1234yf, R-1234ze, R32, R-447A, R-452A, R-452B, R-454A, R-454B, R-454C, R-455A, and the like), motion detectors, fire detectors, and the like), or combination comprising at least one of the foregoing. The one or more sensors can be used to ensure safety of the worker while they are performing their work. For example, a sensor (such as an gas detector) can be positioned in the air volume near the worker and can be powered by the movable power conversion device 50 to alert the worker if a condition arises (e.g., presence of CO, CO2, or refrigerant gas above a threshold level, or the like) that makes their continued work in the space unsafe. In another example, a sensor (such as a movement detector) can be positioned to view at least a portion of the work area including a hoistway and can be configured to alert the worker in the event that an unforeseen movement occurs (such as the unforeseen or unintended movement of a car, counterweight, door, or other part of an elevator system).

Figure 5:
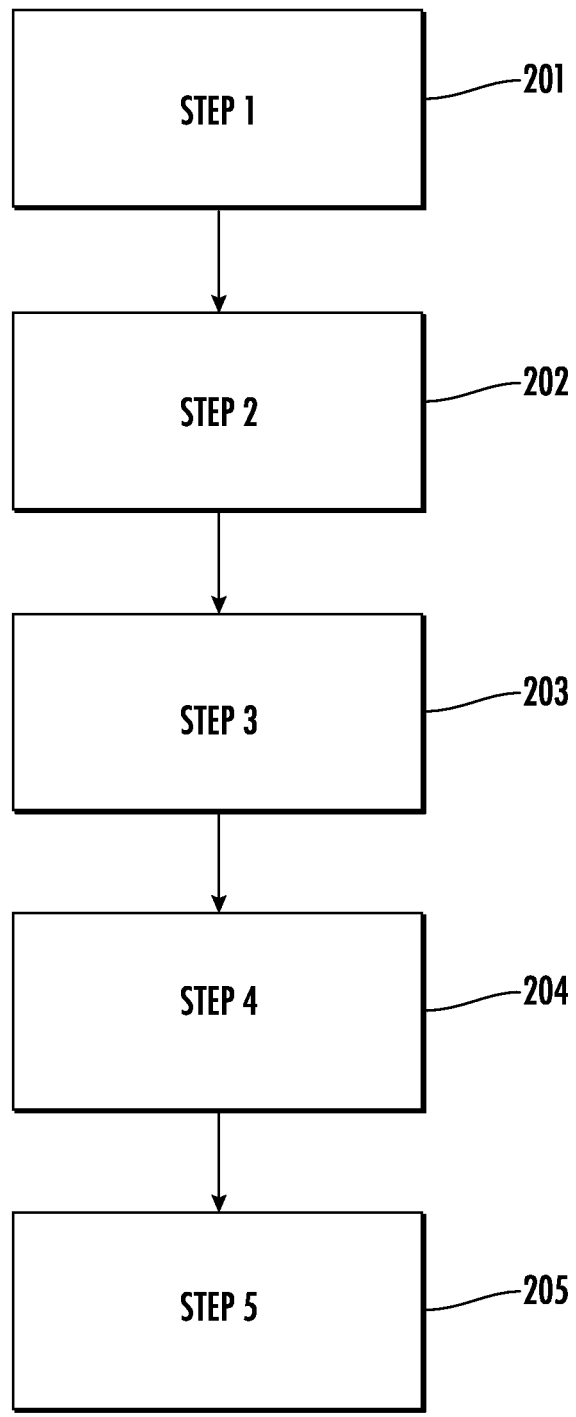
FIG. 5 is a schematic illustration of a method of supplying power to a building equipment worker in the field

FIG. 5 is a schematic illustration of a method of supplying power to a building equipment worker in the field such that the worker can power the work equipment 130 needed to perform the work. A first step 201 can include providing a movable power conversion device 50 having a transformer 60, an input voltage selector 40, a building power interface cable 20, and a power receptacle 80.

A second step 202 can include moving the movable power conversion device to a location proximate a building power grid 115 and an area having building equipment (e.g. equipment that is the subject of the work, such HVAC equipment (e.g., a compressor, heat exchanger, piping, or assembly thereof, of the like), an elevator system (e.g., including an elevator machine, hoistway component, or the like), an escalator system (e.g., including an escalator machine, steps, handrails, drives and the like). For example, the movable power conversion device 50 can be moved into a room (e.g., a machine room, control room, utility room), hallway, elevator, elevator hoistway, a concrete pad, a rooftop, a lobby, or any other location within the interior or exterior of a building.

A third step 203 can include setting the input voltage selector 40 to an unpowered position. The third step should be completed before the fourth step is started as this will ensure that no current flows into the moveable power conversion device 50 when the building power interface cable 20 is connected to the building power grid 115.

A fourth step 204 can include connecting the building power interface cable 20 to the building power grid 115. The building interface cable 20 can be interfaced to the building power grid 115 in any suitable way, for example it can be attached through flying leads 21 to terminals of a breaker of a distribution circuit of the building power grid 115 power.

Once the building power interface cable 20 is connected to the building power grid 115, the input voltage selector 40 can be moved from the off position to a powered position. Accordingly, a fifth step 205 can include selecting a supply voltage of the building power grid 115 with the input voltage selector 40. The supply voltage of the building power grid 115 can be selected to match the input voltage of the transformer 60 (highest voltage across the input side 62 of the transformer 60) or can a lesser voltage. For example, the worker can use the input voltage selector to select a supply voltage of up to 600 Volts (VAC), for example, configured for input levels of about 575 VAC, or about 480 VAC, or about 460 VAC, or about 230 VAC, or about 220 VAC, or about 208 VAC.

Optionally the movable power device 50 can include an indicator, such as an alarm, light, or combination thereof, configured to indicate if the input voltage selector 40 is set to a position that matches, or does not match, the actual voltage of the building power grid 115 to which the building power interface cable 20 is connected. For example, a circuit can be used to sense the voltage input to, or output from, the transformer to confirm, or disconfirm, the correct voltage level. In this case, when the building power interface cable 20 is connected to a voltage different than the setting of the input voltage selector 40 the indicator could detect the wrong voltage and either alert the worker of the situation or not indicate successful connection. For example, a green indicator light can be illuminated to indicate a successful, correct engagement of the movable power conversion device 50 to the building power grid 115 (e.g., where the building power grid supply voltage and voltage selected by user on the input voltage selector 40 matches within some reasonable tolerance for building power fluctuations).

The movable power device 50 can also optionally include voltage indicators (e.g., LCD, LED display or the like) disposed in electrical communication with the electrical circuit of the movable power conversion device 50 for displaying voltage values to the worker. For example, displayed include the input voltage from the building power grid 115, the output voltage to the receptacle 80, or voltages therebetween (e.g., input voltage(s) at the inlet side 62, or outlet side 64, of the transformer 60), or a combination comprising at least one of the foregoing. Such voltage display can be passed through the housing 10 for display to the worker.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A movable power conversion device comprising:
   a housing;
   a building power interface cable configured to pass through the housing and attach to a building power grid;
   a plurality of input fuses operatively coupling the building power interface cable to an input voltage selector, wherein the input voltage selector is configured to allow a user to select a voltage of the building power grid;
   a transformer having an input side and an output side, wherein the input side is operatively coupled to the input voltage selector and the output side is operatively coupled to a power receptacle, wherein
   the transformer comprises three or more voltage input connections and the input voltage selector is operable to switch electrical connectivity between said input connections and the building power interface cable such that the transformer input voltage is selectable between two or more voltage input levels by the input voltage selector.

2. The movable power conversion device of claim 1, wherein the input voltage selector comprises a multi-position switch operable to electrically connect and disconnect the building power interface cable and the transformer input side, and operable to switch electrical connectivity between input terminals of the transformer to which the building power interface cable is connected.

3. The movable power conversion device of claim 1, further comprising a plurality of wheels affixed to the housing.

4. The movable power conversion device of claim 1, further comprising an extendable handle affixed to the housing.

5. The movable power conversion device of claim 1, further comprising a cable retainer affixed to the housing for retaining the building power interface cable.

6. The movable power conversion device of claim 4, further comprising a cable retainer affixed to the extendable handle for retaining the building power interface cable.

7. The movable power conversion device of claim 1, wherein the input voltage selector is configured to pass through the housing.

8. The movable power conversion device of claim 1, wherein the input voltage selector comprises a three-position switch.

9. The movable power conversion device of claim 1, wherein the power receptacle comprises a ground fault current interrupter circuit.

* * * * *